(12) United States Patent
Ennabli et al.

(10) Patent No.: US 10,176,422 B2
(45) Date of Patent: Jan. 8, 2019

(54) RIFD TAG WITH A TUNABLE ANTENNA

(71) Applicant: ASSA ABLOY AB, Stockholm (SE)

(72) Inventors: Elies Ennabli, Lausanne (CH);
Jean-Miguel Robadey, Bossonnens (CH); Christian Mirus, Fetigny (CH)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 15/580,016

(22) PCT Filed: Jun. 9, 2015

(86) PCT No.: PCT/IB2015/054347
§ 371 (c)(1),
(2) Date: Dec. 6, 2017

(87) PCT Pub. No.: WO2016/198914
PCT Pub. Date: Dec. 15, 2016

(65) Prior Publication Data
US 2018/0181853 A1 Jun. 28, 2018

(51) Int. Cl.
*G06K 19/06* (2006.01)
*G06K 19/077* (2006.01)
(Continued)

(52) U.S. Cl.
CPC ..... *G06K 19/07773* (2013.01); *H01Q 1/2225* (2013.01); *H01Q 9/0421* (2013.01); *H01Q 13/10* (2013.01); *H01Q 13/103* (2013.01)

(58) Field of Classification Search
CPC ............ G06K 19/07749; G07F 7/1008; G06Q 20/341
(Continued)

(56) References Cited

U.S. PATENT DOCUMENTS

| 6,914,562 B2 | 7/2005 | Forster |
| 7,256,739 B2 | 8/2007 | Usami |

(Continued)

FOREIGN PATENT DOCUMENTS

| EP | 1542309 | 6/2005 |
| EP | 2033146 | 8/2011 |

(Continued)

OTHER PUBLICATIONS

Kwon et al. "Compact slotted planar inverted-F RFID tag mountable on metallic objects," Electronics Letters, Nov. 24, 2005, vol. 41, No. 24, 1308-1310.

(Continued)

*Primary Examiner* — Ahshik Kim
(74) *Attorney, Agent, or Firm* — Sheridan Ross P.C.

(57) ABSTRACT

The RFID tag comprises an antenna (11) connected to a wireless communication device (18). The antenna comprises a conductive planar surface and a slot (14) extending at least in a part of said conductive planar surface, the slot (14) forming a non-conductive area of the antenna and defining a first part (12) and a second part (13) of the antenna. The wireless communication device comprises two contact pads (16, 17) being electrically connected respectively each to one of the first and second part of the antenna. The slot comprises a closed end formed by a further conductive part connecting said first and second parts the antenna and further comprises at least one conductive bridge (19-19''', 20, 21-21'') connecting said first and second parts of the antenna, the conductive bridge allowing to tune the resonance frequency of the tag by varying the length of the electrical path between the pads from the wireless communication device in the antenna.

20 Claims, 5 Drawing Sheets

(51) Int. Cl.
*H01Q 1/22* (2006.01)
*H01Q 13/10* (2006.01)
*H01Q 9/04* (2006.01)

(58) Field of Classification Search
USPC .......................................................... 235/492
See application file for complete search history.

(56) References Cited

U.S. PATENT DOCUMENTS

| | | | |
|---|---|---|---|
| 7,342,498 B2 | 3/2008 | Baba et al. | |
| 7,768,400 B2 | 8/2010 | Lawrence et al. | |
| 7,880,619 B2 | 2/2011 | Brown et al. | |
| 8,264,358 B2 | 9/2012 | Brown et al. | |
| 8,299,927 B2 | 10/2012 | Lawrence et al. | |
| 8,502,678 B2 | 8/2013 | Brown et al. | |
| 9,104,952 B2 | 8/2015 | Lawrence et al. | |
| 2002/0167450 A1 | 11/2002 | Korden et al. | |
| 2003/0122721 A1 | 7/2003 | Sievenpiper | |
| 2005/0093677 A1 | 5/2005 | Forster et al. | |
| 2006/0054710 A1* | 3/2006 | Forster | H01Q 1/22 235/492 |
| 2006/0071792 A1* | 4/2006 | Caron | G06K 19/07749 340/572.1 |
| 2006/0125703 A1 | 6/2006 | Ma et al. | |
| 2007/0017986 A1 | 1/2007 | Carrender et al. | |
| 2007/0188327 A1* | 8/2007 | Keeton | H01Q 1/22 340/572.7 |
| 2008/0106379 A1* | 5/2008 | Haddock | G06K 19/14 340/10.1 |
| 2008/0315992 A1* | 12/2008 | Forster | G06K 19/07749 340/10.1 |
| 2014/0187178 A1* | 7/2014 | Yang | H01Q 9/06 455/77 |
| 2014/0191042 A1 | 7/2014 | Brown et al. | |
| 2015/0145744 A1* | 5/2015 | Kao | H01Q 9/0421 343/852 |

FOREIGN PATENT DOCUMENTS

| | | |
|---|---|---|
| EP | 1907991 | 3/2012 |
| WO | WO 2004/088583 | 10/2004 |
| WO | WO 2011/141860 | 11/2011 |

OTHER PUBLICATIONS

Rao et al. "Antenna Design for UHF RFID Tags: A Review and a Practical Application," IEEE Transactions on Antennas and Propagation, Dec. 2005, vol. 53, No. 12, pp. 3870-3876.

Ukkonen et al. "A Novel Tag Design Using Inverted-F Antenna for Radio Frequency Identification of Metallic Objects," Advances in Wired and Wireless Communication, IEEE 2004, May 2004, 4 pages.

International Search Report and Written Opinion prepared by the European Patent Office dated Feb. 3, 2016, for International Application No. PCT/IB2015/054347.

* cited by examiner (ENLARGED DETAIL OF FIGURE 2)

RIFD TAG WITH A TUNABLE ANTENNA

CROSS REFERENCE TO RELATED APPLICATIONS

This application is a national stage application under 35 U.S.C. 371 and claims the benefit of PCT Application No. PCT/IB2015/054347 having an international filing date of 9 Jun. 2015, which designated the United States, the disclosures of which are incorporated herein by reference in its entirety.

TECHNICAL FIELD

The present invention concerns the RFID tags and labels, and more particularly the field of tags and labels that comprise an antenna

BACKGROUND ART

UHF RFID tags and labels are often designed to meet customer requirements in term of mechanical strength, thermic resistance and read range performance.

Low cost, popular UHF RFID tags for industry and logistics applications comprise, in general a UHF inlay packaged in a housing (generally made of plastic) containing the inlay in order to protect the fragile antenna and chip from outdoor conditions: rain, impact shocks, snow, dust etc . . . .

As example, a UHF inlay could comprises a 6-10 µm thick aluminium etched antenna on a 50-100 µm thick substrate made of PET, on which a RFID chip is soldered. The inlay is thin and therefore flexible. The inlay has a thin layer of adhesive on the bottom side, so one can stick the inlay thanks to its adhesive layer (just like stickers) to a substrate for example.

A housing is generally formed by a bottom part and a cover which are sealed together once the RFID inlay has been placed inside. In some other embodiment, the housing could be provided as one single piece of material which is injected around the inlay.

Industry and logistics applications often require the tag to be attached/affixed on metallic items/objects. For UHF, this is bad news since at UHF frequencies the reflected waves from the metal is added to incident waves in a destructive way, and therefore the UHF antenna inside the tag collects a very weak signal/very small energy to feed the UHF chip. A popular technique to solve this issue is to use some specific antenna types rather than others; typically antenna types that are able to collect more energy than others for the same form factor. A popular antenna type is the PIFA antenna, well-known in the GSM world, and now becoming the antenna of choice in the RFID UHF world.

The PIFA antenna of course must be adapted to RFID applications so that visually it is different than the ones used in the GSM world, but its principle is the same. This antenna requires a substrate since the PIFA antenna is a "3D" antenna (a PIFA antenna must have 2 conductive layers in parallel, connected together by a third perpendicular conductive surface layer). For the low cost UHF RFID tags used in industry and logistics applications, the substrate is in general made of plastic with a thickness ranging from 1 to 15 mm.

The RFID tags described above are typical low cost UHF RFID tags for industry and logistics applications.

Another example of an RIFD tag or label is given in US 2005/0093677 to Forster et al., in the following description referred to as "US'677".

Specifically US'677 discloses an RFID device comprising a hybrid loop-slot antenna which increases its readability. To this effect, the radio frequency identification (RFID) device comprises a conductive antenna structure having an elongated slot therein. Parts of the antenna structure on both sides of one end of the elongated slot are coupled to a wireless communication device, such as a RFID chip or interposer. On the opposite end of the elongated slot, parts of the antenna structure at both sides of the elongated slot are electrically coupled together, for instance by a conductive part of the antenna structure. Typically, all parts of the antenna structure may be parts of a continuous unitary layer of conductive material deposited on a substrate. The antenna structure with the elongated slot therein is intended to increase the readability of the RFID device, particularly in directions out from the edges of the RFID device. The antenna structure may be directly conductively coupled to the wireless communication device. Alternatively, the antenna structure may be indirectly (reactively) coupled to the RFID device, such as by a capacitive coupling.

On the other hand, there is also a need in the market to provide tunable or fine-tunable antennas for RFID tags that perform well in metallic environments.

Many antenna types exist (example: Dipole antenna, patch antenna such PIFA antenna, horn antenna etc.) for all kinds of applications as is illustrated for example in US'677 discussed above: as shown in this publication, the RIFD tags may be used to mark clothing items or bottles or bottle caps.

A known antenna that is suitable for such need of good performance in a metallic environment is the slotted type such the one described in the book of John D. Kraus "ANTENNAS", third edition (pages 304-320), which has been adapted to the RFID because of the reasons mentioned hereunder.

The antenna described in this book is for typical applications such as radar, satellite, GSM, microwave systems etc. In such typical applications, the impedance of reference is the standard impedance of 50 Ohms, which is obtained using adaptive/matching circuits between antenna and source. But in the more recent domain of the RFID UHF world, because one of the most important requirement/constraint is the low cost of the UHF tag, one has to avoid the use of any additional circuit except for the transceiver chip and antenna.

Furthermore, an adaptive circuit dedicated to impedance matching will create energy losses and since UHF RFID tags are passive tags they only use the power from a radio wave source. Therefore any energy loss will strongly reduce the sensitivity performance of the chip.

In other words, the antenna should be able to impedance match itself to the transceiver chip impedance for maximum power transfer without the use of an additional circuit and one cannot directly use the antenna design proposed by Kraus.

It is therefore an aim of the present invention to provide an RFID tag that may be easily tuned to take account of its desired application and environment.

In addition, it is a further aim of the present invention to provide an RFID tag that may easily be fine-tuned in a passive manner.

Moreover, RFID tags have become more popular today and they are used in many different applications for example for marking all kinds of products in everyday life, as illustrated in the US'677 mentioned above as an example.

In this extend, there is a need to provide patch antennas for UHF RFID tags that may easily be tuned to simplify the production processes and deliver products that may easily be adapted at the customer's end to the desired properties. Such customization is interesting as it allows the fabrication of standardized products that may be easily adapted to the need of the end user after production, rather than the fabrication of many different products each individually customized at the early production stage.

A mass production of standard RFID tags also allows a drastic reduction of cost for the end user who can then carry out the necessary customization that suits his needs. A good example of it would be a unique UHF tag design which would only need a minor "personalization" to be operational in the different geographical markets: either Europe, USA and Japan, as each market has specific operational frequency (Europe: 865 MHz, USA: 902-928 MHz, Japan: 956-960 MHz).

In addition, it is known that such prior art slotted UHF RFID tags have temperature limitations and they usually only withstand a maximum temperature of 65° C. according to storage temperature tests that have been carried out.

Specifically, one has noticed that above 65° C., electrical measurements of tags showed an unacceptable detuning of the tag: concretely, above this temperature the resonance frequency of the tag shifted away from the frequency of interest. After a careful analysis, it was observed that the tags which were subjected to these temperatures accumulated gas underneath their inlay and the gas was in fact generated by the adhesive used to glue the inlay to the substrate The gas generated between the substrate and the inlay at these temperatures, by accumulation, then created a pressure increase between the substrate and the inlay which then caused a partial separation of the layers. This separation process had the effect of creating a de-tuning (shift in resonance frequency) of the tag because the dielectric constant of the immediate surroundings of the antenna was different after the partial separation.

In normal tag design conditions, this de-tuning does not create a problem, but tags in the presently considered field have a particularity: they have a very high Q-factor when affixed on metallic items, because their antenna has been designed to perform well very near metallic objects. Because the Q-factor is high, any slight de-tuning has the consequence of rendering the tag practically unusable. Thus, it is necessary to maintain as much as possible the precise resonance frequency of the tag avoiding any de-tuning, even in extreme conditions such as high temperature, otherwise the tags will not perform as expected in the considered environment.

This temperature limitation has been regarded as too low in the field, and there has been a constant need to find a solution improving this aspect and thus to design tags that are able to resist to higher temperatures with no performance degradation, especially in the applications mentioned hereabove.

In view of the above discussion, there is a clear need to develop an improved version of tags for RFID UHF applications that does not possess the identified drawbacks of the known devices of the prior art.

SUMMARY OF THE INVENTION

It is therefore an aim of the present invention to provide improved RFID tags.

Another aim of the present invention is to provide tags that have a tunable or fine-tunable slotted antenna and that perform well in metallic environments.

A further aim of the present invention is to provide tags with a frequency tuning capabilities that may be easily adjusted to the end user's needs.

A further aim of the present invention is to provide simple means that allow compensation of the de-tuning of the tag caused by the presence of gas bubble underneath the inlay.

In one aspect of the invention, there is provided an antenna for a RFID device that comprises means for an easy adjustment of its resonance frequency.

In one embodiment, the invention concerns an RFID tag comprising an antenna connected to a wireless communication device, wherein said antenna comprises a conductive planar surface and a slot extending at least in a part of said conductive planar surface. The slot forms a non-conductive area of the antenna and defining a first part and a second part of the antenna, wherein said wireless communication device comprises two contact pads being electrically connected respectively each to one of the first and second part of the antenna, wherein said slot comprises a closed end wherein a further conductive part of the antenna connect said first and second parts of the antenna, and wherein said slot further comprises at least one conductive bridge connecting said first and second parts of the antenna, said conductive bridge allowing to tune the resonance frequency of the tag by varying the length of the electrical path between the pads from the wireless communication device in the antenna.

In one embodiment the one least one conductive bridge is positioned between the closed end of the slot and the wireless communication device.

In one embodiment, the varying of the path length is made by removing at least one conductive bridge.

In one embodiment, the tag comprises several conductive bridges positioned between the closed end of the slot and the wireless communication device.

In one embodiment, the width of each bridge as the pitch between each pair of bridges is defined by the tuning effect desired to be created by the removal of the respective bridges.

In one embodiment, the slot has one single linear shape and comprises one single closed end. The closed end is distal from the wireless communication device.

In one embodiment, the slot shows at least one bifurcation such that it comprises multiple closed ends which are distal from the wireless communication device.

In one embodiment, each bridge is associated with a frequency indicator.

In one embodiment, the indicator is a marking on the antenna.

In one embodiment, the tag comprises an external housing, and the external housing comprises means for the removal of the conductive bridges of the antenna.

In one embodiment, the tag comprises a substrate on which the antenna is fixed.

In one embodiment, the substrate is a thin flexible plastic layer wherein the antenna is etched with the bridges.

In one embodiment, the substrate is glued on a support body.

In one embodiment, the invention concerns a method for fine-tuning a tag as defined herein.

The method comprises the step of removal of at least one conductive bridge to adjust the resonant frequency of the antenna by changing the electrical path in the antenna.

In one embodiment of the method, the removal of the conductive bridge includes a cutting, a burning or a destruction action on said bridge.

In one embodiment of the method, the antenna is fixed on a substrate and wherein the removal of the conductive bridge includes at the same time the perforation of the substrate part underneath the bridges.

A beneficial effect of the present invention is that on the one hand it allows an easy adjustment of the resonance frequency, but also at the same time the perforation on that area of the substrate of the antenna allows to liberate the gas thus not letting it accumulate underneath the inlay and not having an effect on the frequency of the tag. This is clearly a favourable combined effect in the context of the present invention.

DETAILED DESCRIPTION OF THE INVENTION

Figure 1:
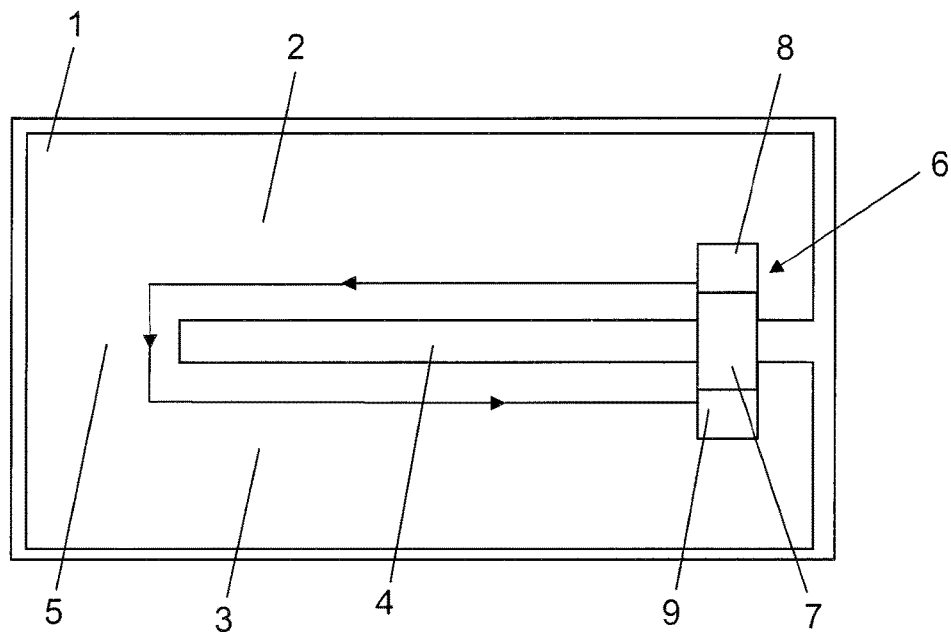
FIG. 1 illustrates an example of an RFID tag according to the prior art.

In FIG. 1, an illustration of a RFID tag of the prior art is given as an example. Typically, this representation corresponds to an embodiment of US'677 discussed above.

This tag comprises, for example, a substrate layer 1 on which an antenna is placed. The antenna comprises a first part 2, a second part 3 and both parts 2, 3 are separated by a slot 4. The closed end 5 of the slot 4 make a bridge between the two parts of the antenna 2, 3. An RFID device 6 is mounted on the two antenna parts 2, 3 at the open end of the slot 4. The RFID device 6 comprises a chip module comprising a chip 7 mounted on two conductive pads 8 and 9 which are respectively coupled to parts 2 and 3.

The arrows in FIG. 1 illustrate the circuit path from one side of the chip 8 to the other along the first and second parts 2, 3 of the antenna over the closed end 5 of the slot 4.

Figure 2:
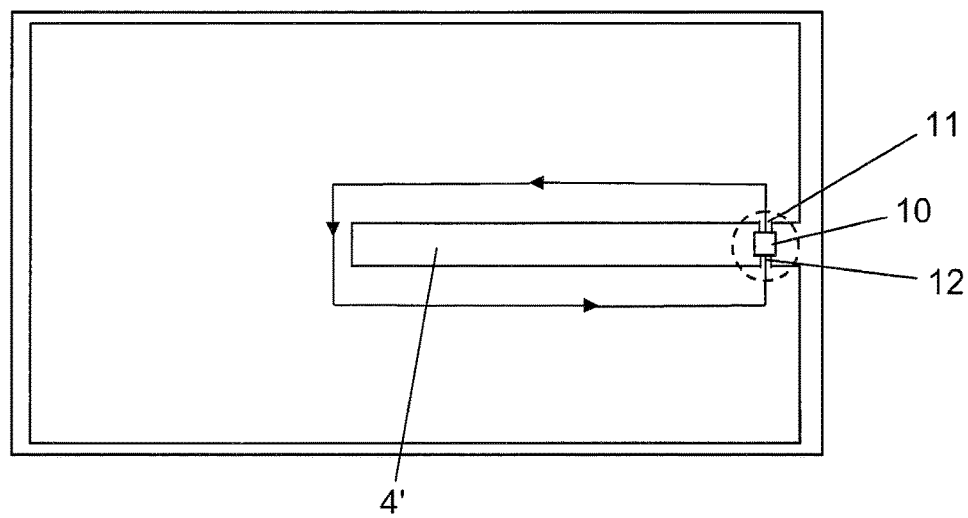
FIG. 2 illustrates a variant of an RFID tag according to the prior art.

Alternatively, as illustrated in FIG. 2, the RFID device 10 could consists simply of a RFID chip with connection pads to connect to the parts 2 and 3 of the antenna. Advantageously, and due to the actual extremely small dimension of such RFID chips, the parts 2 and 3 may comprise small extensions 11 and 12 which are suitably designed to be respectively coupled to the connection pads of the chip 10. This is illustrates with more details FIG. 2A.

Specifically, the RFID chip 10 comprises two contact pads 16, 17 (marked by the dashed lines as they are on the other side of the chip 10). Each contact pad 16, 17 is connected to the extensions 11 and 12 of the antenna via flip-chip or any other appropriate technique known in the art for ensuring an electrical contact.

It is not relevant for the present invention which form the RFID device (module 6, direct connected chip 10, etc . . . ) will take. The RFID device has simply to be connected respectively to each part 2 and 3 of the antenna over the slot 4.

The length of the slot 4 determines the frequency at which the antenna works best. The shorter the length of the slot 4, the higher the frequency and, conversely, the longer is the length, the lower the frequency. Accordingly, the length of the slot may be used to adjust the working frequency of the antenna. But in the prior art, the length is fixed so no adjustment using this principle is possible.

As an example, the order of shift in frequency is about 10 MHz per mm of shortening/lengthening of the slot 4.

Technically, it is not recommended that the slot 4 is too wide, since the benefit of having a conductive area as large as possible must be maintained: a reduction of the overall conductive area can cause the disappearance of the benefit of such antennas which respond well near metallic objects (this type of antenna has its benefit from the fact that the large conductive surface creates good capacitive response when antenna is near metal objects). As an example: for a total surface of the conductive area of 36 cm2, and antenna well-tuned at the frequency of interest at 915 MHz, a widthwise decrease/increase of the conductive area by only 1-2% can cause a shift in frequency by 20-30 MHz!

In addition, a lengthwise decrease/increase of the area by the same amount causes half the shift of frequency.

Further, the slot 4 should not too be too long as it can have the result of cutting the conductive area in two. This will transform the antenna into a dipole antenna which is not a simple slotted antenna anymore. The benefits of the slotted antenna near metal objects will then be lost as a dipole antenna reacts more badly near metal surfaces.

The dependency of the resonance frequency on the length of the slot 4 is explained here below.

The electrical path in antenna is the path which the electrons take to get from pad 8 to pad 9 (see FIG. 1). The path which is taken is always the shortest one, this is natural. The length of this path determines the resonance frequency. The longer this path is, the lower the resonance frequency is and vice versa.

Hence by making the slot longer, while the position of the chip 8 is unchanged, the path is longer and the resonance frequency is shifted to lower values. By making the slot shorter (see slot 4' in FIG. 2), the path is shorter and the resonance frequency is shifted to higher values.

In accordance with an embodiment of the present invention, an idea is to add a bridge in the slot to create an additional path in the antenna.

Figure 2A:
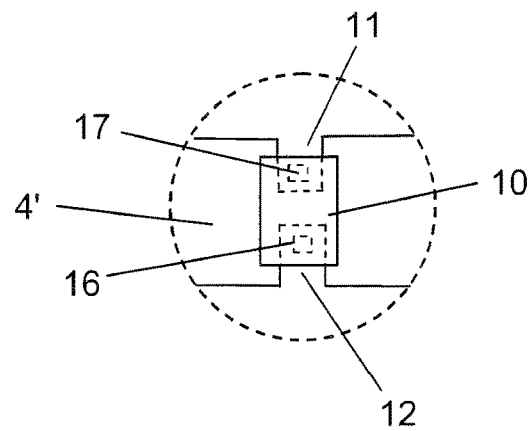
FIG. 2A is an enlargement of a detail of FIG. 2.
Figure 3:
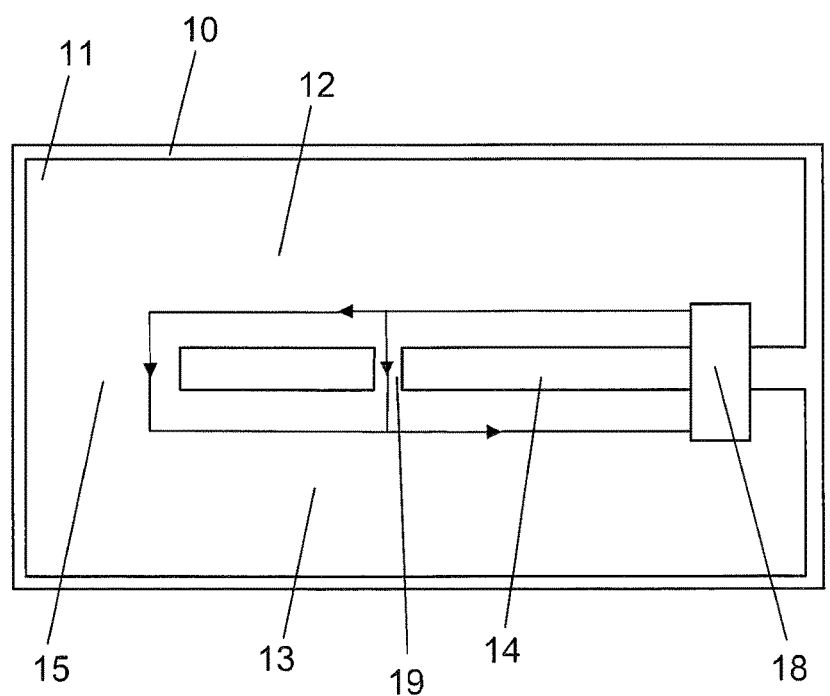
FIG. 3 illustrates an embodiment of the present invention.

FIG. 3 illustrates this principle. It shows a substrate layer 10 with on which an antenna 11 is placed. The antenna 11 comprises a first part 12, a second part 13 and both parts 12, 13 of the antenna are separated by a slot 14. The closed end 15 of the slot 14 forms a connection between the two parts of the antenna 12, 13. The RFID device 18 is connected to the two antenna parts 12, 13 at the open end of the slot 14 via connection pads (not illustrated in the figures as they are underneath the device 18). In this embodiment, as in all others of the present invention, the RFID device 18 may be of any type, for example as illustrated in FIGS. 1 and 2, 2A. Thus it may be a chip directly connected to the antenna, or a chip module (for example as illustrated in FIGS. 1 and 2) or any other configuration of a RFID chip to be connected respectively to each part 2 and 3 of the antenna over the slot 4.

In accordance with the principle of the present invention, the slot 14 comprises at least one bridge 19 that is placed between the RFID device 18 and the end connection 15 of the slot 14. This bridge 19 thus allows the formation of a shorter path which will be the preferred path for the electrons. The two possible paths are illustrated in FIG. 3, one leaving one contact of the RFID device 18 and arriving at another contact of the RFID device 18 via connection 15 (as in the prior art of FIG. 1) and the other leaving one contact of the device 18 and arriving at another contact of the device 18 via bridge 19.

Accordingly, the tag of FIG. 3 therefore has two possible paths of different lengths thus having potentially two different working frequencies. As the path naturally chosen is the shorter one, in the configuration of FIG. 3, the effective path will go through the bridge 19.

However, it is possible, by removing said bridge 19, to change the path of the electrons to consequently change the working frequency of the antenna and thus adjust said frequency to a user's need.

According to a preferred embodiment, the bridge 19 is manufactured together with the rest of the patch antenna 11, for example via etching. But alternatively, and depending on the method of manufacturing chosen for the antenna 11, the bridge 19 could be a totally separate element which will be added during a further manufacturing step.

As said above, after production of the inlay and antenna, a manufacturer can choose to cut the bridge 19 if it is desired to shift frequency to ETSI frequencies (~870 MHz) or choose let it as it to let the resonance frequency resonating at FCC (~915 MHz). A properly positioned bridge 19 according to the principle of the present invention allows an easy adaptation to such frequencies.

As in general, the company that makes the assembly of the tags is different from the inlay manufacturer, and the site of inlay production is not the site for tag assembly (they are even rarely in same country), in accordance with the principles of the invention, the tag manufacturer will not have to order two different types of antenna from the inlay production sites, but simply only one type of antenna then decide to cut the bridge 19 or not depending on the frequency desired tag, or depending on the customer's need.

The principle of the present invention may be applied to further embodiments in which more than one bridge 19 are present, thus giving more adjustment freedom to specific frequencies by removal of the appropriate bridge(s).

Figure 4:
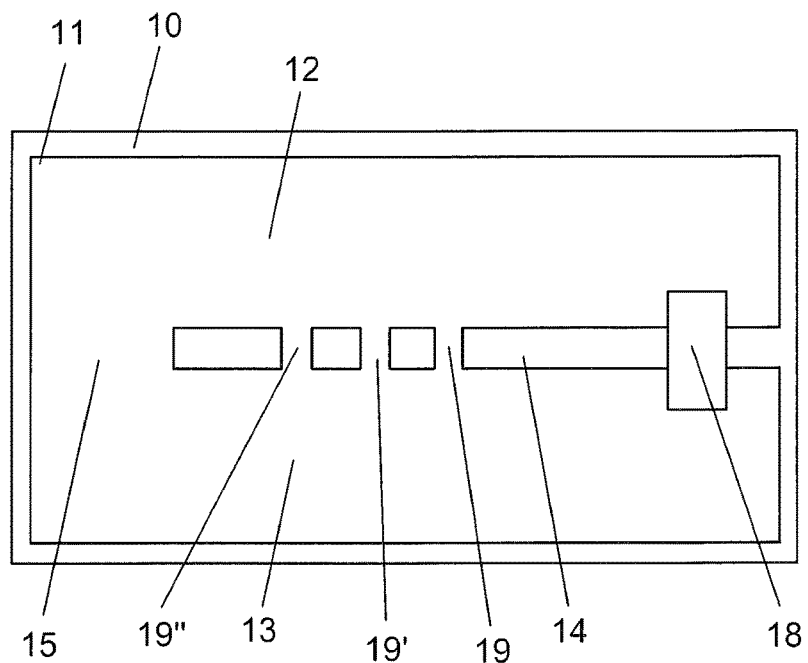
FIG. 4 illustrate another embodiment of the present invention.

A non-limiting example of this principle is illustrated in FIG. 4 in which more than one bridge 19 is present, in this instance three bridges 19, 19' and 19" are present. This embodiment may be of course varied with more bridges and the distance between the bridges 19, 19', 19" (so called "pitch") may be the same or different.

Then depending on how many bridges are cut, and also the pitch, the frequency can be finely defined.

According to these principles, when using more than two bridges, the smaller the pitch (distance) between two bridges, the more refined the tuning will be. For example, with a pitch of 2 mm, the tuning refinement can be about 10 MHz, and with for example a pitch of 3 mm this refinement can be about 25-30 MHz, and so on . . . .

For a smaller tuning adjustment, for instance of 5 MHz, this results in an incision precision which will be down to 0.5 mm a result difficult to reach manually. A possibility to reach such a refined tuning is using a laser system to make the incision, and by using vision device (for example a camera) to give the laser the precise location to cut the desired bridge or bridges. This method and these means will allow a refined tuning at a massive production scale meeting the actual production standards and outputs.

Of course, the bridges may be placed in different configurations with different pitches (distances) and the slot may also have different shapes as will be illustrated in the following exemplary and non-limiting embodiments.

Figure 5:
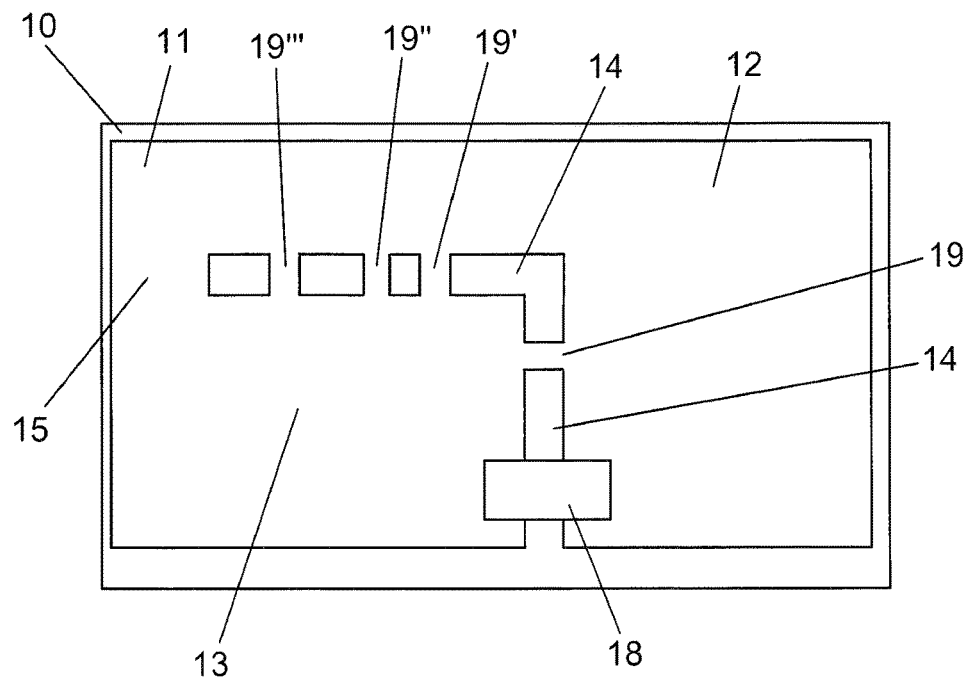
FIG. 5 illustrates a further embodiment of the present invention.

For example, FIG. 5 illustrates an embodiment where the slot 14 is "L"-shaped and it comprises four bridges 19, 19', 19", 19'". The bridge 19 is placed in a different branch of the "L" and the other bridges 19', 19" and 19'" are in another branch of the slot 14. As illustrated here, the pitch (i.e. distance) between the bridges 19', 19" and 19'" is different, the distance between bridges 19" and 19' being smaller that the distance between bridges 19" and 19'". Of course this may be varied and all the pitches may be the same or not.

Also, the shape of the slot is not limited to a straight or L-shape but many other geometrical equivalent shapes are possible and within the scope of the present invention, thus not limited to the illustrative drawings.

Figure 6:
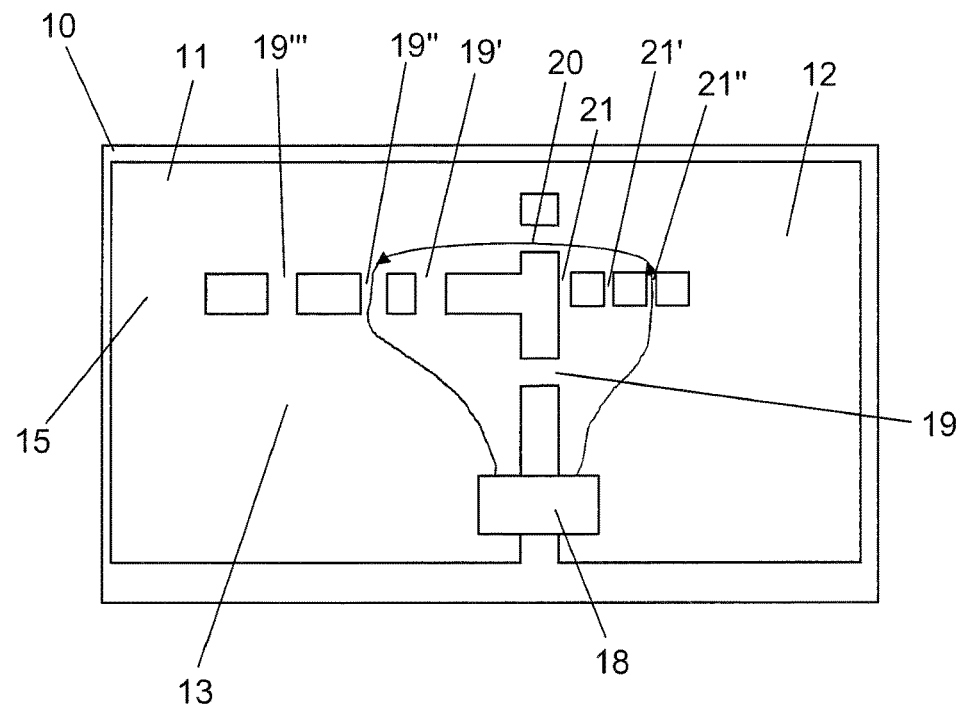
FIG. 6 illustrates a further embodiment of the present invention.

FIG. 6 illustrates a further embodiment of the invention with the represented bridges 19-19'" as in FIG. 5, and additional bridges 20 and 21-21". All these bridges give the user more freedom to play with the fine-tuning of the antenna to a desired frequency. Also the pitches may be used as an adjustment parameter for the frequencies. As an illustration, the preferred path of electrons if the bridges 19, 19', 21 and 21' are removed/cut has been represented on FIG. 6.

Figure 7:
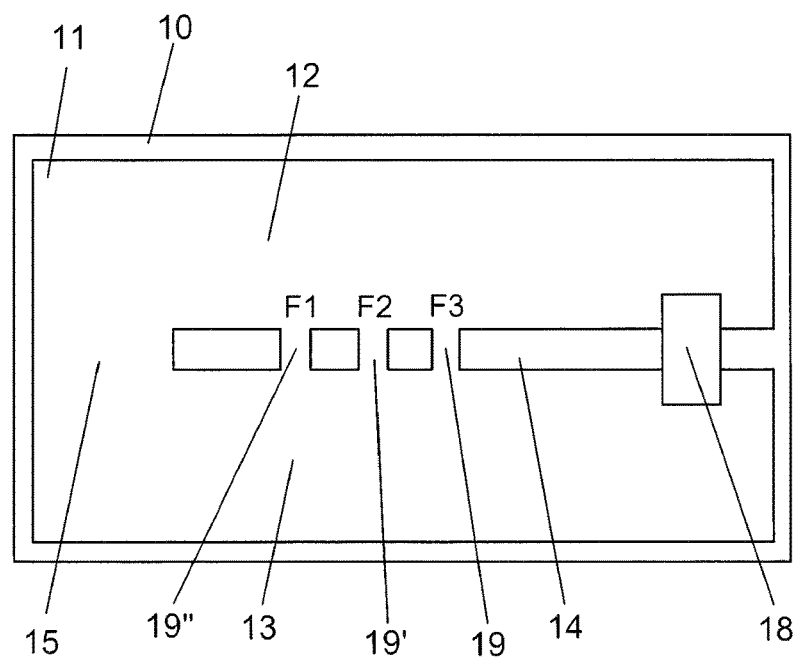
FIG. 7 illustrates a further embodiment of the present invention.

FIG. 7 illustrate a further embodiment of the present invention. In this embodiment, the bridges each comprise an indicator that will indicate the tuning frequency of the considered bridge (considering that the previous bridge in the slot have been removed/cut). This indicator may be any sign (the frequency being given by a correspondence table) or directly the frequency itself. In FIG. 7, the illustration is based on FIG. 4 for the sake of simplicity but the shown marking F1, F2 and F3 may of course be applied to any embodiment of the present invention in an equivalent manner.

Figure 8:
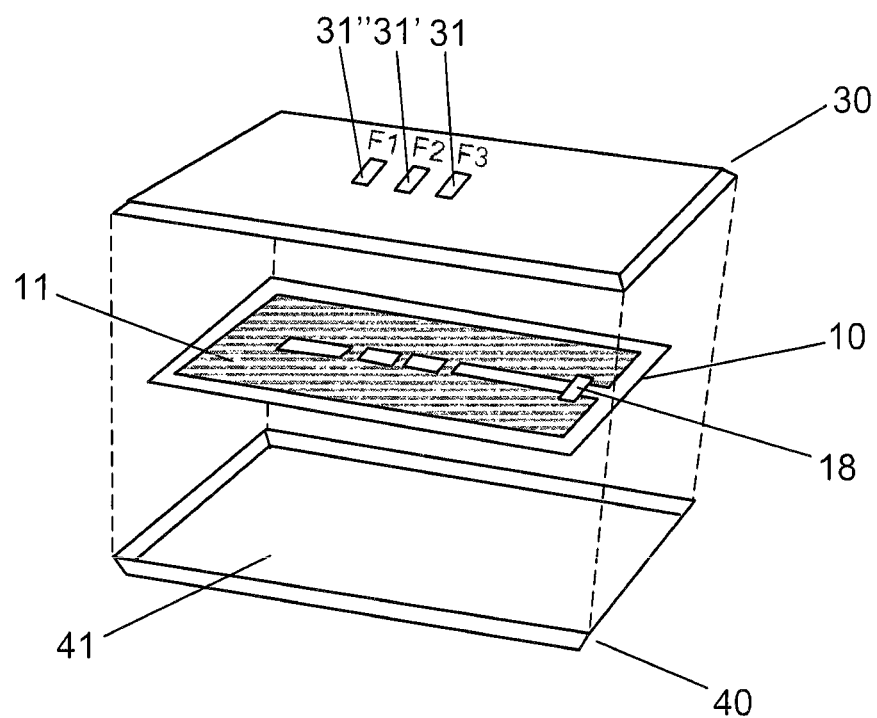
FIG. 8 illustrates a perspective view of a further embodiment of the present invention.

FIG. 8 shows an exploded view of an example of a version of a RFID tag according to the invention. The tag comprises a UHF inlay as discussed in the previous embodiments which is placed in a housing comprising a base 40 and a cover 30. The two parts 40 and 30 are preferably made of injected plastic and can be easily joined and sealed together to form a final tag which will be usable even under harsh conditions.

The cover 30 and base 40 may be attached together by any suitable process: gluing, ultra-sonic welding etc. to form the final tag. They are made of any suitable material, for example from synthetic materials such as ABS, PC and other equivalents.

The base 40 shows an internal surface 41 which is adapted to receive the UHF inlay. Preferably and as discussed previously, the substrate 10 is a thin flexible plastic layer and the antenna 11 is etched with the bridges on the substrate 10. The substrate may be fixed for example by gluing on the internal surface 41 of the base 40 as shown on FIG. 8.

FIG. 8 illustrates a special embodiment of the cover 30 forming the tag housing with the base 40. This cover 30 comprises means 31, 31', 31" for allowing the removal of the respective bridges 19, 19' and 19" of the antenna.

These means 31-31" may be of different type and may comprise an indicator such as a frequency indicator as discussed in reference to FIG. 7, but on the cover 30 instead of on the inlay.

In one embodiment, the means 31-31" are openings in the cover 30, that is a space with no material (for example if the removal of bridges is made by cutting the bridges).

In another embodiment, the means 31-31" may be a window made of transparent material if the removal of the bridges is made without contact of a tool with the bridge (for example by optical means such as a laser).

In another embodiment, the means 31-31' may also be removable caps which can be take away to proceed to the related bridges removal.

In a further embodiment, the means 31-31" may comprise a cutting element on the inside facing the antenna to allow the cutting of the desired bridges by pressing on said means 31-31".

Of course, many other configurations of the means 31-31" are possible within the scope of the present invention, as long as they allow a bridge removal in accordance with the principles of the present invention.

In FIG. 8, the configuration of FIG. 4 has been used as a base to shape the means 31-31" for the sake of simplicity: hence means 31-31" are arranged to correspond to bridges 19-19" of FIG. 4. The cover may have other means as well which will correspond to other bridges present on the antenna, for example as illustrated in FIG. 5 or 6 and discussed above. In any case, the configuration of means 31-31" is adapted to the bridge configuration to allow the desired action on the bridges in accordance with the principle of the present invention.

Hence the means 31-31" may have corresponding shapes and placement (as in FIG. 8 in which the antenna 11 corresponds to the configuration of FIG. 4), or they may have a different shape. They may also have the shape of the slot 14 and not of individual bridges, or any combination of configurations.

In a variant, it is also possible to combine different types of means 31-31" on the same cover: one or several could be an opening, others may comprise a window, others may comprise a cutting means. Any combination is possible and may be chosen according to circumstances.

However, mainly in reason of manufacturing cost, a preferred embodiment of the invention will be to provide a housing and in particular a cover 30 without the means 31-31'. In this embodiment, it is therefore necessary to remove the desired bridge(s) before the tag is closed, i.e. before the cover 30 and base 40 are attached to each other as indicated above in reference to FIG. 8.

The removal of the bridge may be made with any suitable process: cutting, laser removal, burning or another destruction action on said bridge by any suitable means etc.

And it can be made before or after the inlay is fixed/glued to the surface 41. For example, a tag manufacturer could command UHF inlays tuned to a defined frequency to an inlay provider, which is going to remove the appropriate bridges before to deliver the inlays. Or, as alternative example, the tag manufacturer would have original inlays (without any bridge removed) fixed on housing parts (like the base 40) in stock, and will proceed to bridge removal just before sealing the tags as orders for tags tuned to a defined frequency are received.

According to one embodiment of the method, wherein the removal of the conductive bridges 19-19'", 20, 21-21" as described in detail herein includes in addition at the same time a perforation step of the substrate part underneath the bridges. This step has thus a beneficial effect: on the one hand it allows an easy adjustment of the resonance frequency, but also at the same time the formation of a small incision on that area of the substrate where the bridge(s) is (are) situated allows to liberate the gas possibly accumulated underneath the inlay (otherwise gas is having a bad effect on the frequency of the tag, as described above in the present description when discussing the influence of temperature on tags). This is clearly a favourable effect in the context of the present invention in which a fine tuning is possible and at the same time the removal of a potential cause of unwanted change of tuning of the considered antenna 11.

Preferably, the area in which the incision/perforation is to be made should be in middle of the substrate 10, where gas would possibly mostly accumulate. Therefore, the design of the antenna 11, in particular the positioning of the slot 14 and of its respective bridges 19-19'", 20, 21-21", may be carefully chosen in order that the related cuts will be provided in this central area (or any area in which the gas could potentially accumulate).

The embodiments of the present invention have been given as illustrative examples of realization and should not be construed in a limiting manner. Many variants are possible within the scope of the present invention using equivalent means.

What is claimed is:

1. An RFID tag comprising an antenna connected to a wireless communication device, wherein said antenna comprises a conductive planar surface and a slot extending at least in a part of said conductive planar surface, said slot forming a non-conductive area of the antenna and defining a first part and a second part of the antenna, wherein said wireless communication device comprises two contact pads being electrically connected respectively each to one of the first and second part of the antenna, wherein said slot comprises a closed end formed by a further conductive part connecting said first and second parts the antenna, and wherein said slot further comprises at least one conductive bridge connecting said first and second parts of the antenna, said conductive bridge allowing to tune the resonance frequency of the tag by varying the length of the electrical path between the pads from the wireless communication device in the antenna.

2. The RFID tag as defined in claim 1, wherein the one least one conductive bridge is positioned between the said closed end of the slot and the wireless communication device.

3. The RFID tag as defined in claim 1, wherein the varying of the path length is made by removing at least one conductive bridge.

4. The RFID tag as defined in claim 1, wherein the tag comprises several conductive bridges positioned between the said closed end of the slot and the wireless communication device.

5. The RFID tag as defined in claim 4, wherein the width of each bridge and the pitch between each pair of bridges is defined by the tuning effect desired to be created by the removal of the respective bridges.

6. The RFID tag as defined in claim 1, wherein the slot is one single linear shape and comprises one single close end distal from the wireless communication device.

7. The RFID tag as defined in claim 1, wherein the slot comprises at least one bifurcation such that it comprises multiple close ends distal from the wireless communication device.

8. The RFID tag as defined in claim 1, wherein each bridge is associated with a frequency indicator.

9. The RFID tag as defined in claim 8, wherein the indicator is a marking on the antenna.

10. The RFID tag as defined in claim 1, wherein the tag comprises an external housing, and the external housing comprises means for the removal of at least one of the conductive bridges of the antenna.

11. The RFID tag as defined in claim 1, wherein the tag comprises a substrate on which the antenna is fixed.

12. The RFID tag as defined in claim 11, wherein said substrate is a thin flexible plastic layer wherein the antenna is etched with the bridges.

13. The tag as defined in claim 11, wherein the substrate is glued on the support body.

14. The RFID tag as defined in claim 1, wherein the tag comprises an external housing, and the external housing comprises a window associated with the at least one bridge.

15. The RFID tag as defined in claim 1, wherein the slot is non-linear.

16. A method for fine-tuning the tag as defined in claim 1, wherein said method comprises a removal of at least one of said conductive bridge(s) to adjust the resonant frequency of the antenna by changing the electrical path in the antenna.

17. The method as defined in claim 16, wherein the removal of the conductive bridge includes a cutting, a burning or a destruction action on said bridge.

18. The method as defined in claim 16, wherein the antenna is fixed on a substrate and wherein the removal of the conductive bridge includes at the same time the perforation of the substrate part underneath the bridges.

19. The method as defined in claim 16, further comprising varying at least one of the width of the bridges and the pitch between pairs of bridges.

20. A method for fine-tuning the tag as defined in claim 14, wherein the method comprises removal of at least one conductive bridge by a laser to adjust the resonant frequency of the antenna by changing the electrical path in the antenna.

* * * * *